US012656513B2

(12) United States Patent
Stein et al.

(10) Patent No.: US 12,656,513 B2
(45) Date of Patent: Jun. 16, 2026

(54) NEUTRON COUNTING BY DELAYED CAPTURE-GAMMA DETECTION (DCD)

(71) Applicant: TARGET SYSTEMELEKTRONIK GMBH & CO. KG, Wuppertal (DE)

(72) Inventors: Juergen Stein, Wuppertal (DE); Guntram Pausch, Dresden (DE)

(73) Assignee: Rapiscan Holdings, Inc., Torrance, CA (US)

( * ) Notice: Subject to any disclaimer, the term of this patent is extended or adjusted under 35 U.S.C. 154(b) by 189 days.

(21) Appl. No.: 18/235,503

(22) Filed: Aug. 18, 2023

(65) Prior Publication Data

US 2023/0400597 A1 Dec. 14, 2023

Related U.S. Application Data

(63) Continuation of application No. PCT/EP2021/054154, filed on Feb. 19, 2021.

(51) Int. Cl.
*G01T 3/06* (2006.01)
*G01T 1/20* (2006.01)

(52) U.S. Cl.
CPC .............. *G01T 3/06* (2013.01); *G01T 1/2018* (2013.01)

(58) Field of Classification Search
CPC ........ G01T 3/06; G01T 1/2018; G01T 1/2008
See application file for complete search history.

(56) References Cited

U.S. PATENT DOCUMENTS

| | | | |
|---|---|---|---|
| 2,982,860 | A | 5/1961 | Nehrbas |
| 3,089,955 | A | 5/1963 | Scherbatskoy |
| 3,171,032 | A | 2/1965 | Holt |

(Continued)

FOREIGN PATENT DOCUMENTS

| | | |
|---|---|---|
| CN | 201021941 | 2/2008 |
| CN | 101939783 | 1/2011 |

(Continued)

OTHER PUBLICATIONS

International Search Report issued by the European Patent Office for International Patent Application No. PCT/EP2021/054154, dated Oct. 26, 2021.

(Continued)

*Primary Examiner* — Kiho Kim
(74) *Attorney, Agent, or Firm* — Novel IP

(57) ABSTRACT

An apparatus to detect neutrons and gamma rays is provided. The apparatus has at least one scintillator material and at least one neutron-gamma converter in gamma communication with the scintillator material. The neutron-gamma converter is adapted to emit gamma radiation upon capturing neutrons. The apparatus further has an analyzer. The neutron-gamma converter has at least one isotope having a daughter nucleus having a level scheme having at least one long-lived excited state, where the long-lived excited state has a lifetime between 1 nanosecond and 500 nanoseconds, and is at least sometimes involved in de-excitation cascades following neutron captures. The analyzer finds and analyzes delayed detections comprising prompt components and delayed components in the recorded signal in order to quantify event parameters and to compute a measure for a thermal neutron flux the apparatus is exposed to using the event parameters.

17 Claims, 6 Drawing Sheets

(56) References Cited

U.S. PATENT DOCUMENTS

| | | | |
|---|---|---|---|
| 3,184,597 A | 5/1965 | Scherbatskoy | |
| 3,428,804 A | 2/1969 | Comunnetti | |
| 3,515,878 A | 6/1970 | Ried, Jr. | |
| 3,922,541 A | 11/1975 | Seeman | |
| 4,209,695 A | 6/1980 | Arnold | |
| 4,272,677 A | 6/1981 | Berthold | |
| 4,618,775 A | 10/1986 | Persyk | |
| 4,717,825 A | 1/1988 | Smith, Jr. | |
| 4,820,914 A | 4/1989 | Allen | |
| 4,883,956 A | 11/1989 | Melcher | |
| 4,918,314 A | 4/1990 | Sonne | |
| 5,079,424 A | 1/1992 | Kobayashi | |
| 5,198,670 A | 3/1993 | Vancauter | |
| 5,218,202 A | 6/1993 | Evers | |
| 5,298,756 A | 3/1994 | McCollum | |
| 5,360,975 A | 11/1994 | Stoller | |
| 5,548,111 A | 8/1996 | Nurmi | |
| 5,600,135 A | 2/1997 | Jacobson | |
| 5,866,907 A | 2/1999 | Drukier | |
| 6,021,341 A | 2/2000 | Scibilia | |
| 6,087,656 A | 7/2000 | Kimmich | |
| 7,005,646 B1 | 2/2006 | Jordanov | |
| 7,157,681 B1 | 1/2007 | Tetzlaff | |
| 7,253,761 B1 | 8/2007 | Hoyos | |
| 7,480,362 B2 | 1/2009 | Carmi | |
| 9,269,552 B2 | 2/2016 | Steiner | |
| 9,411,058 B2 * | 8/2016 | Penumadu | G01T 3/06 |
| 9,864,076 B2 | 1/2018 | Stein | |
| 10,048,393 B2 | 8/2018 | Stein | |
| 10,061,041 B2 | 8/2018 | Rowland | |
| 10,520,612 B2 | 12/2019 | Stein | |
| 10,527,742 B2 | 1/2020 | Stein | |
| 10,859,718 B1 * | 12/2020 | Nagarkar | G01T 1/29 |
| 11,105,940 B2 | 8/2021 | Iwatschenko-Borho | |
| 11,163,076 B2 | 11/2021 | Stein | |
| 11,448,777 B2 | 9/2022 | Stein | |
| 11,693,134 B2 | 7/2023 | Behar | |
| 2004/0016867 A1 | 1/2004 | Milshtein | |
| 2005/0258371 A1 | 11/2005 | Stein | |
| 2006/0081786 A1 | 4/2006 | Berthold | |
| 2006/0126776 A1 | 6/2006 | Izumi | |
| 2006/0289775 A1 | 12/2006 | Inbar | |
| 2007/0013899 A1 | 1/2007 | Wolters | |
| 2009/0146073 A1 | 6/2009 | Stein | |
| 2009/0230285 A1 | 9/2009 | Wright | |
| 2009/0272910 A1 | 11/2009 | Grynyov | |
| 2010/0020922 A1 | 1/2010 | Carmi | |
| 2010/0065746 A1 | 3/2010 | Grazioso | |
| 2010/0090114 A1 | 4/2010 | Bauer | |
| 2010/0301196 A1 | 12/2010 | Chu | |
| 2011/0031405 A1 | 2/2011 | Kulik | |
| 2011/0091207 A1 | 4/2011 | Xie | |
| 2011/0101230 A1 | 5/2011 | Inbar | |
| 2011/0182407 A1 | 7/2011 | Morton | |
| 2011/0186740 A1 | 8/2011 | Normand | |
| 2011/0204243 A1 | 8/2011 | Bendahan | |
| 2011/0211675 A1 | 9/2011 | Ramsden | |
| 2012/0175514 A1 | 7/2012 | Izumi | |
| 2012/0305783 A1 | 12/2012 | Gagnon | |
| 2012/0314827 A1 | 12/2012 | Dioszegi | |
| 2013/0256520 A1 | 10/2013 | Korkin | |
| 2013/0299702 A1 * | 11/2013 | Zaitseva | G21K 4/00 |
| | | | 250/361 R |
| 2014/0061488 A1 | 3/2014 | Sato | |
| 2014/0077073 A1 | 3/2014 | Vu | |
| 2014/0084149 A1 | 3/2014 | Stoller | |
| 2014/0151529 A1 | 6/2014 | Steiner | |
| 2014/0151549 A1 | 6/2014 | Steiner | |
| 2014/0348286 A1 | 11/2014 | Rowland | |
| 2015/0162174 A1 | 6/2015 | Badiei | |
| 2015/0212218 A1 | 7/2015 | Manslow | |
| 2015/0247938 A1 | 9/2015 | Penumadu | |
| 2015/0327827 A1 | 11/2015 | Teshigawara | |
| 2016/0003671 A1 | 1/2016 | Fontbonne | |
| 2016/0223494 A1 | 8/2016 | Steiner | |
| 2016/0291196 A1 | 10/2016 | De Vita | |
| 2016/0372309 A1 | 12/2016 | Steiner | |
| 2017/0227659 A1 | 8/2017 | Stein | |
| 2018/0275309 A1 | 9/2018 | Berheide | |
| 2018/0336976 A1 * | 11/2018 | Pozzi | G16Z 99/00 |
| 2019/0212458 A1 | 7/2019 | Iwatschenko-Borho | |
| 2022/0326401 A1 | 10/2022 | Aronkytö | |
| 2023/0003910 A1 | 1/2023 | Stein | |
| 2023/0400597 A1 | 12/2023 | Stein | |
| 2024/0159921 A1 | 5/2024 | Pausch | |

FOREIGN PATENT DOCUMENTS

| | | |
|---|---|---|
| DE | 2826484 | 12/1979 |
| DE | 10209161 | 9/2003 |
| EP | 2354809 | 8/2011 |
| EP | 3 401706 A1 | 11/2018 |
| GB | 2023814 | 1/1980 |
| JP | S5819024 | 4/1983 |
| JP | H0197892 | 4/1989 |
| JP | 2002357692 | 12/2002 |
| RU | 2276352 C2 | 5/2006 |
| WO | 9002415 | 3/1990 |
| WO | 2011012155 A1 | 2/2011 |
| WO | 2012080443 | 6/2012 |
| WO | 2013116241 A1 | 8/2013 |
| WO | 2014136990 | 9/2014 |
| WO | 2016066185 | 5/2016 |
| WO | 2017202793 A1 | 11/2017 |
| WO | 2017202793 A9 | 1/2018 |

OTHER PUBLICATIONS

Sudeep Mitra, "Time-Sequenced Prompt y Neutron Activation Analysis", Encyclopedia of Analytical Chemistry, 2009, pp. 1-16, John Wiley & Sons, Ltd.

Blaj et al., "Optimal Pulse Processing, Pile-Up Decomposition, and Applications of Silicon Drift Detectors at LCLS", IEEE Transactions on Nuclear Science, Nov. 2017, pp. 2854-2868, vol. 64, No. 11, IEEE.

Födisch et al., "Digital high-pass filter deconvolution by means of an infinite impulse response filter", Nuclear Instruments and Methods in Physics Research A, Jun. 11, 2016, pp. 484-496, vol. 830, Elsevier B.V.

Georgiev et al., "Digital Pulse Processing in High Resolution, High Throughput Gamma-Ray Spectroscopy", IEEE Transactions on Nuclear Science, Aug. 1993, pp. 770-779, vol. 40, No. 4, IEEE.

Mitchell et al., "Neutron Detection With Gamma-Ray Spectrometers for Border Security Applications", IEEE Transactions on Nuclear Science, Aug. 18, 2010, pp. 2215-2219, vol. 57, No. 4, IEEE.

Pausch et al., "Neutron detection by measuring capture gammas in a calorimetric approach", Nuclear Instruments and Methods in Physics Research A, Sep. 8, 2010, pp. 374-380, Elsevier B.V.

Pausch et al., "Neutron detection based on capture-gamma sensing and calorimetry", Active and Passive Signatures III, 2012, pp. 838209-1-838209-11, Proc. of SPIE, vol. 8382, SPIE.

Scoullar et al., "Real Time Pulse Pile-up Recovery in a High Throughput Digital Pulse Processor", Applications of Nuclear Techniques, API Conf. Proc. 1412, 2011, pp. 270-277, American Institute of Physics.

Yakushev et al., "Sensitive neutron detection method using delayed coincidence transitions in existing iodine-containing detectors", Nuclear Instruments and Methods in Physics Research A, 2017, pp. 162-165, vol. 848, Elsevier B.V.

International Search Report for corresponding International Application No. PCT/EP2015/060390 dated Aug. 31, 2015.

International Search Report for corresponding International Application No. PCT/EP2015/060384 dated Aug. 26, 2015.

Chen C et al, "Front-end electronics for the CDF-II time-of-flight system", IEEE Transactions on Nuclear Science, IEEE Service Center, New York, NY, US, (Dec. 1, 2003), vol. 50, No. 6, doi:10.1109/TNS.2003.820632, ISSN 0018-9499, pp. 2486-2490, XP011106678.

(56)  References Cited

OTHER PUBLICATIONS

International Search Report issued for International Patent Application No. PCT/EP2015/074282 dated Jun. 28, 2016.

Chen et al.: "Front-end electronics for the CDF-II time-of-flight system", IEEE Transactions on Nuclear Science, vol. 50, No. 6, pp. 2486-2490, IEEE Service Center, New York, NY, Dec. 1, 2003.

International Search Report with a Written Opinion issued for corresponding International Application No. PCT/EP2014/073037 dated Jul. 24, 2015.

[XAI]—Wen Xianfei et al, "Measuring the scintillation decay time for different energy deposited by [gamma]-rays and neutrons in a Cs2LiYCl6:Ce3+detector", Nuclear Instruments & Methods in Physics Research. Section A: Accelerators, Spectrometers, Detectors, and Associated Equipment, Elsevier BV * North-Holland, NL, (Feb. 9, 2017), vol. 853, doi:10.1016/J.NIMA.2017.02.019, ISSN 0168-9002, pp. 9-15, XP029936730.

Kyle Polack et al. "Dual-Particle Imager for Standoff Detection of Special Nuclear Material", IEEE Nuclear Science Symposium Conference Record, Oct. 23, 2011, pp. 1494-1500, IEEE.

Soundara-Pandian L et al, "Lithium Alkaline Halides-Next Generation of Dual Mode Scintillators", IEEE Transactions on Nuclear Science, IEEE Service Center, New York, NY, US, vol. 63, No. 2, doi:10.1109/TNS.2016.2535355, ISSN 0018-9499, (Apr. 1, 2016), pp. 490-496, (Apr. 18, 2016), XP011606934.

International Search Report issued by the International Searching Authority for corresponding International Patent Application No. PCT/EP2018/061938, dated Jul. 25, 2018.

Soundara-Pandian et al., "Lithium Alkaline Halides-Next Generation of Dual Mode Scintillators", IEEE Transactions on Nuclear Science, Apr. 1, 2016, pp. 490-496, vol. 63, No. 2, IEEE Service Center, NY, NY.

Wen et al. "Measuring the scintillation decay time for different energy deposited by [gamma]-rays and neutrons in a Cs2LiYCl6:Ce3+ detector" Nuclear Instruments & Methods in Physics Research, Section A: Accelerators, Spectrometers, Detectors, and Associated Equipment, Feb. 9, 2017, pp. 9-15, vol. 853, Elsevier BV, North-Holland, NL.

International Search Report for corresponding International Application No. PCT/EP2019/061977 dated Jul. 17, 2019.

International Search Report issued for International Patent Application No. PCT/EP2020/055875, mailed on Oct. 15, 2020.

Bartle et al., "Small inorganic scintillators as neutron detectors," Nuclear Instruments and Methods in Physics Research, Section A, pp. 54-58, Elsevier Science B.V., 1999.

Holm et al., "Neutron detection with a Nal spectrometer using high-energy photons," Nuclear Instruments and Methods in Physics Research, Section A, pp. 59-63, Elsevier Science B.V., Sep. 12, 2012.

Bjorn J Scholz, "First Observation Of Coherent Elastic Neutrino-Nucleus Scattering", arxiv.org, Cornell University Library, 201 Olin Library Cornell University Ithaca, NY 14853, (Apr. 2, 2019), doi:10.1007/978-3-319-99747-6, XP081163650.

Carter J et al, "Detectors for Gamma-Ray Burst Astronomy", Space Science Instrumentation,, (May 1, 1977), vol. 3, No. 2, pp. 123-129, XP001431870 Abstract Only.

International Search Report for PCT/EP2021/061467, Jan. 19, 2022.

* cited by examiner

NEUTRON COUNTING BY DELAYED CAPTURE-GAMMA DETECTION (DCD)

CROSS REFERENCE TO RELATED APPLICATIONS

This application is a continuation of International Application No. PCT/EP2021/054154, filed Feb. 19, 2021, the contents of which are incorporated by reference herein.

FIELD OF THE INVENTION

The present invention relates to the field of radiation detection, more specifically the detection of neutrons by gamma-ray detection.

BACKGROUND

Neutrons emitted from spontaneous or induced fission provide a strong signature for the presence of Special Nuclear Material (SNM). The detection of SNM is of particular interest for homeland security applications—portal monitors, handheld instruments, backpack monitors, etc. Further, the simultaneous detection of neutrons and gamma rays as such is of particular interest for the monitoring of nuclear (power) systems and particle accelerators as well as for geophysical borehole investigations.

An efficient simultaneous detection of (slow) neutrons and gamma rays by just one detector instead of two types of detectors thereby would be a major advantage for the detection of SNM—not only in the context of homeland security applications.

Neutrons are neutral particles carrying a mass and a magnetic moment. Due to their nature, the interaction of neutrons with matter (disregarding their magnetic moment) is bound to an interaction with nuclei, and therefore occurs with low probabilities for most materials.

The (kinetic) energies of free neutrons span a range of many orders of magnitude. A large fraction of neutrons emitted in spontaneous or induced fission reaction have energies of up to 10 MeV, classified into three neutron energy regimes: slow neutrons (<1 keV), intermediate neutrons (1 keV to 0.5 MeV) and fast neutrons (0.5 MeV to 10 MeV).

The interaction of neutrons with matter—as neutron capture or neutron scattering—strongly depends on the neutron energy. Slow neutrons, in particular thermal neutrons, i.e. neutrons whose kinetic energy distribution corresponds to the Boltzmann distribution at room temperature, are more likely to be captured than fast neutrons. The neutron cross section defines the likelihood of an interaction between a neutron and a nucleus.

Most of the conventional neutron detection methods are based on the $^3$He(n,p)$^3$H, the $^6$Li(n,$\alpha$)$^3$H, or the $^{10}$B(n,$\alpha$)$^7$Li reactions. These reactions emit ionizing particles, which are easy to detect and well distinguishable from gamma rays. Further, $^3$He, $^6$Li and $^{10}$B are distinguished by a large capture cross section for thermal neutrons.

The emitted charged particles generate short but dense ionization tracks with ranges of a few micrometers in solids, and up to some millimeters in gases of appropriate pressure. Consequently, the neutron-capturing component must be either a constituent of the detection medium (as, e.g., in $^3$He and BF$_3$ tubes, scintillators comprising $^6$Li), or it must be provided as a thin layer in close contact with the detector medium (as, e.g., in $^{10}$B-coated proportional counters). The neutron-capturing component should consist of isotope-separated nuclides to avoid competing neutron-capture reactions reducing the detection efficiency. Therefore, corresponding detectors are often expensive. With the exception of $^6$Li-comprising scintillators, these detectors are also not usable for gamma-ray spectroscopy.

In addition, $^3$He has become very expensive recently due to a serious shortage.

An alternative and cheaper solution for neutron detection in applications that are utilizing gamma ray detectors anyway is based on neutron capture reactions with subsequent emission of photons, so-called Neutron Capture Detectors (NCD). An NCD detects neutrons by measuring the gamma radiation following neutron captures in a neutron-gamma converter arranged around or comprised in the gamma-ray detector, as disclosed in EP 24 600 32 A1 and WO 2011/012155 A1. Naturally, a major challenge of any NCD is to discriminate between the signal of gamma rays stemming from neutron capture and signal of ubiquitous gamma rays of external sources.

In neutron capture reactions a neutron is trapped by a nucleus $^A$X resulting in a daughter nucleus $^{A+1}$X with an excitation corresponding to the neutron separation energy $S_n(^{A+1}X)$. Subsequently, this energy is released in form of a gamma-ray cascade. The cascade may involve continuum states and distinct gamma transitions. The discrete lines represent fingerprints of the capturing nuclide or a mixture of nuclides, e.g. of chemical elements in their natural isotope composition. The gamma rays emitted upon thermal neutron capture, in particular the so-called "prompt gamma rays from slow neutron capture" are used for elemental analysis by neutron activation, e.g. in homeland security applications and borehole investigations. The energies and intensities of prompt gamma rays from neutron capture are continually being characterized and tabulated, e.g. in the "Database of prompt gamma rays from slow neutron capture for elemental analysis", IAEA (2007).

The detection of gamma rays generally is based on the measurement of electric currents. The electrons and positrons produced in gamma-ray interactions with the detector medium either directly produce electron-hole pairs in semiconductor materials or are converted into electric charge by means of a scintillator material and a photodetector with internal or external amplification.

EP 17 170 025.5 relates to a method to detect both gamma rays and fast neutrons using a scintillator crystal providing different light pulse shapes for recoil electrons and recoil nuclei, such as Tl-doped NaI, for homeland security applications. This method is restricted, however, to the detection of fast neutrons.

EP 24 600 32 A1 relates to an NCD comprising a gamma ray detector supplemented with neutron-gamma converters for an as much as possible calorimetric detection of the gamma-ray cascades following neutron capture reactions. The limitation of this approach is due to the sensitivity of an NCD for ambient gamma radiation.

WO 2011/012155 A1 relates to an NCD consisting of one or more gamma ray detectors comprising a neutron-gamma converting isotope of a chemical element used as constituent or dopant of the active detector material for an as much as possible calorimetric detection of the gamma-ray cascades following neutron capture reactions. The limitation of this approach is due to the sensitivity of an NCD for ambient gamma radiation.

The only way to distinguish between neutron capture gamma rays and gamma rays of other sources in an NCD is the rejection of detector signal corresponding to energy depositions below approximately 3 MeV, the NCD threshold, for being considered as neutron signals, since common radioactive nuclides do not emit noticeable fractions of gamma rays with energies above 2615 keV.

The major drawback of signal rejection below the NCD threshold is that neutron-capture gamma-ray cascades leading to energy dispositions in the gamma-ray detector below the NCD threshold are also rejected. Such cases would not occur if the NCD warranted a truly calorimetric detection of neutron-capture gamma-ray cascades. In practice the calorimetric regime could only be approached by an appropriate construction and by using a reasonably large and dense gamma-ray detector. Hence, the NCD threshold reduces the probability of detecting neutrons, i.e. the sensitivity of the detector. The sensitivity loss scales with the deviation from a truly calorimetric regime. Therefore, large sizes and corresponding high weights of NCD are required to counteract on the delimiting conditions of an NCD imposed by the NCD threshold.

Yakushev et al proposed in Nucl.Inst.Meth. A 848 (2017) 162 a method for thermal neutron detection in scintillators comprising iodine, as common Tl-doped NaI scintillators. Natural iodine only consists of the stable $^{127}$I isotope which provides a relatively large thermal neutron capture cross section of 6.2 barn. This cross section is large enough to absorb a considerable fraction of thermal neutrons interacting with a Tl-doped NaI scintillator of usual dimensions (2-3" diameter, 2-3" height). The de-excitation cascade following neutron capture on $^{127}$I often involves the 137.85 keV state in $^{128}$I having a half-life ($T_{1/2}$) of 845 ns. The de-excitation cascade of the 137.85 keV state in $^{128}$I involves low-energy gamma rays and converted transitions of which a large fraction is detected in the NaI detector itself—with a certain delay following the prompt part of the de-excitation cascade which may also be at least partially absorbed and thus generate a signal in the NaI detector. Consequently, the resulting electric current signal of a gamma cascade upon thermal neutron capture sometimes exhibits a double pulse within a time window of 1-2 μs, wherein the second pulse fits to an energy deposition of approximately 140 keV. Hence, neutrons are detected if the distribution of time differences of double pulses exhibits the 845 ns decay component, whereby the strength of the 845 ns decay component reflects the thermal neutron flux the NCD is exposed to. Using the technique of Yakushev et al, thermal neutrons can be discriminated from a gamma radiation background stemming from other (external) sources as long as the background is low enough to not significantly contaminate the double-pulse time-difference distribution by random pulse pile-ups. According to Yakushev et al, however, the analysis of the double pulse resulting from delayed gamma rays upon neutron capture is only possible because the time constant of the delayed gamma emission, 845 ns, is large in comparison to the light decay time of the Tl-doped NaI scintillator used in the demonstration which is approximately 250 ns.

The method of Yakushev et al has at least the following disadvantages:

the method is exclusively dedicated to iodine comprising scintillators, the method is limited to time constants or half-lives of delayed gamma emission that are large compared to the light decay time of the iodine comprising scintillator, in order to measure a distinguishable double pulse signal instead of an undistinguishable pulse pile-up of the prompt signal and the delayed pulse, and the method has limited efficiency as it exploits just a single long-lived state in $^{128}$I, the 137.85 keV state, however, gamma cascades of its de-excitation occur only in 3% of all neutron captures in $^{127}$I, as disclosed in the "Database of prompt gamma rays from slow neutron capture for elemental analysis".

Pulse pile-up is a well-known and persisting problem in the field of radiation detection. Nuclear reactions and accompanying de-excitation cascades occur randomly. On the one hand, the time difference between consecutive pulses recorded in gamma ray detectors follows the probability density function of an exponential distribution. Hence, small time differences between consecutive pulses are more likely than large time differences. On the other hand, the pulse duration is controlled by the decay time of the scintillator which defines the time scale for temporal resolution. In case the time difference between consecutive pulses becomes shorter than the pulse duration, the signals pile up. The energy determination of a corresponding event, meaning an integration of the signal over time to measure the charge content, fails in case of a pulse pile-up, i.e. it cannot provide correct results for the two piled-up signals.

Pulse pile-ups can be detected, e.g. by comparing the ratio of two shifted integrals over each signal pulse. While single pulses will always return the same ratio of the shifted integrals, the ratio of shifted integrals of pulse pile-ups deviates.

Based on the identification of pile-up events, the signals of piled-up pulses often are rejected. The major disadvantage of pulse pile-up rejection, however, is the loss of potentially valuable signal.

In a publication by Scoullar et al, AIP Conf. Proc. 1412 (2011) 270, a method for real-time decoding of pulse pile-up events for a range of detectors, including scintillation based radiation detectors is suggested. This method is model-based and characterizes the number, time-of-arrival and energy of all events in the detector output. In doing so, composite events are decoded and energy and time-of arrival of multi-pulse pile-ups are recovered, with a pulse pair resolution of down to 50 ns. An important constraint of this approach is the fixation of the pulse shape expected from the detector.

Pulse pile-up decomposition techniques have so far been of particular advantage in high-flux pulsed beam experiments with low duty cycle and relatively slow detectors, such as Free Electron Lasers for which pulse pile-ups are unavoidable and signal collection is expensive. In usual spectroscopic measurements higher count rates lead to a more severe disturbance of the spectrum due to pulse pile-up. Sufficiently high input rates, however, usually allow the partial loss of signals, rendering the pulse pile-up rejection the method of choice.

SUMMARY

An object of the present disclosure is to provide a system and a corresponding method allowing the detection of neutrons in a way that minimizes the mentioned drawbacks of current neutron detectors at least partially thereby improving the sensitivity of neutron detectors and the feasibility of their large-scale deployment.

This problem may be solved by an apparatus and a method for detecting neutrons using delayed capture-gamma detection (DCD) according to this disclosure.

The apparatus provided herein is an Enhanced Neutron Capture Detector (ENCD).

More specifically, the disclosure provides an apparatus to detect neutrons and gamma rays, comprising at least one gamma-ray detector comprising at least one scintillator material with a light decay time, a photo detector with an amplifier, wherein the at least one gamma-ray detector is adapted to record an electrical signal from an interaction between gamma rays and the at least one scintillator material, wherein the electrical signal is in a known relationship with the energy deposited by the detected gamma rays in the at least one scintillator material, at least one neutron-gamma converter in gamma communication with the at least one scintillator material of the at least one gamma-ray detector, wherein the at least one neutron-gamma converter is adapted to emit gamma radiation upon capturing neutrons, at least one digitizer comprising sampling Analog to Digital Converters, ADC, wherein each of the at least one digitizer is adapted to sample the electrical signal of the at least one gamma-ray detector with a predetermined frequency to generate digitized time series data of the detected gamma rays, and an analyzer which is coupled operatively to the at least one digitizer, wherein the at least one digitizer is adapted to transmit the digitized time series data to the analyzer, and wherein the analyzer is adapted to analyze the digitized time series data. The at least one neutron-gamma converter comprises at least one isotope having a thermal neutron capture cross-section larger than 1 barn and a daughter nucleus having a level scheme comprising at least one long-lived excited state, wherein the at least one long-lived excited state has a lifetime between 1 nanosecond and 500 nanoseconds, and is at least sometimes involved in de-excitation cascades following neutron captures, resulting in an electrical signal of the at least one gamma-ray detector comprising delayed gamma radiation of de-excitation cascades from the at least one long-lived excited state emitted by said at least one neutron-gamma converter following a prompt gamma radiation emitted by said at least one neutron-gamma converter. The analyzer is adapted to find and analyze delayed detections comprising prompt components and delayed components in the digitized time series data of the at least one digitizer in order to quantify event parameters, the event parameters comprising the time differences between said prompt components and delayed components, and the energy deposited in the at least one scintillator material by the delayed gamma radiation, and the analyzer is adapted to compute a measure for a thermal neutron flux the apparatus is exposed to using the event parameters.

Preferably, the photo detector of the at least one gamma-ray detector is a photomultiplier tube, a silicon photomultiplier (SiPM), or an avalanche photodiode. The amplifier can be integrated into the photo detector, or be an external amplifier to amplify the electric signal generated by the photodetector.

Preferably, the lifetime of the at least one long-lived excited state is smaller than the light decay time of the at least one scintillator material. Consequently, pulse pile-ups of the signals due to the prompt and the delayed components of the gamma-ray de-excitation cascades following neutron captures are unavoidable. However, the analyzer of the ENCD is capable of decomposing the detected electrical signal into its components such that delayed components following prompt components upon neutron captures can be resolved even when the lifetime of the at least one long-lived excited states is shorter than the light decay time of the at least one scintillator material.

Further preferably, the at least one isotope of the neutron-gamma converter is at least one of a group of isotopes, the group of isotopes comprising $^{151}Eu$, $^{155}Gd$, $^{157}Gd$ $^{133}Cs$, $^{70}Ge$, $^{79}Br$, $^{81}Br$, $^{127}I$, $^{56}Fe$, $^{110}Cd$, and $^{113}Cd$. The most preferable isotopes are $^{151}Eu$, $^{155}Gd$, $^{157}Gd$, $^{110}Cd$, $^{113}Cd$ due to their very large thermal neutron capture cross sections and long-lived daughter nuclei which are frequently involved in the respective de-excitation cascades.

Preferably, the at least one scintillator material comprises the at least one neutron-gamma converter intrinsically, and is preferably one of a group of materials, wherein the group comprises SrI, preferably with Eu doping, $LaBr_3$, preferably with Ce doping, $CeBr_3$, NaI, preferably with Tl doping, CsI, preferably with Na or Tl doping, organic materials, preferably with Eu or Gd doping, bismuth germanate (BGO), $CdWO_4$ (CWO), and $Gd_2SiO_5$ (GSO), preferably with Ce doping.

Preferably, the analyzer is adapted to carry out pulse pile-up reconstruction techniques, wherein the pulse pile-up reconstruction techniques comprise a method to decompose the digitized time series data into their constituents in order to quantify the event parameters.

The inventors realized for the first time a systematic approach to exploit delayed capture gamma detection (DCD) for the detection of thermal neutrons. The application of digital pulse reconstruction techniques enables novel use of other chemical elements as neutron-gamma converter in the ENCD. Consequently, chemical elements with a large thermal neutron capture cross-section can be selected as neutron-gamma converters for DCD thereby significantly improving the neutron sensitivity of the ENCD.

The neutron-gamma converter can be both integrated into the at least one scintillator material of the at least one gamma-ray detector and/or provided externally.

To the best of the inventors' knowledge, it has not yet been proposed to exploit pulse pile-up reconstruction to resolve prompt and delayed de-excitation cascades upon neutron captures. Pulse pile-up reconstruction techniques for finding and analyzing delayed coincidences in the pulse sequence of the ENCD improves the efficiency of detecting neutron captures by accepting shorter time differences between the prompt component and the delayed component resulting from the de-excitation processes of the daughter nuclei. The lifetimes of the long-lived excited states that are at least sometimes involved in the de-excitation cascades upon neutron captures may even be shorter than the light decay time of the at least one scintillator material. Hence, the disclosure widens the range of neutron-capturing media and long-lived excited states applicable for DCD dramatically.

As a result, neutron-gamma converters of ENCDs can be tailored to comprise isotopes having a large thermal neutron capture cross-section and a daughter nucleus having at least one long-lived state involved in the de-excitation cascade with a large share per neutron capture, which are commercially available in non-toxic, non-expensive chemical compounds, and/or isotopes being already constituents of common gamma-ray detectors.

The efficient detection of (slow) neutrons by gamma-ray detection allows the use of just one detector to simultaneously detect both gamma rays and (slow) neutrons. The present disclosure therefore leverages known detection techniques for SNM, e.g. for homeland security applications and/or geophysical borehole investigation, by providing not only a cheaper and more scalable solution for the detection of (slow) neutrons, but also by providing a detector, an enhanced neutron capture detector (ENCD), for simultaneous yet resolvable detection of gamma-rays and (slow) neutrons.

In one embodiment, the at least one neutron-gamma converter is arranged in form of a Eu-comprising coating covering the at least one scintillator material at least partially.

In an embodiment of the invention, the apparatus comprises a first gamma-ray detector and a second gamma-ray detector, wherein the first gamma-ray detector is adapted to detect both the prompt gamma radiation and the delayed gamma radiation emitted by the at least one neutron-gamma converter, and the second gamma-ray detector is adapted to predominantly detect only the delayed gamma radiation emitted by the at least one neutron-gamma converter. Further, the analyzer is adapted to determine the event parameters by comparing the digitized time series data of the first gamma-ray detector and the second gamma-ray detector in order to find delayed coincidence detections comprising prompt components and delayed components between the first gamma-ray detector and the second gamma-ray detector and to quantify the time differences between said prompt components and delayed components between the first gamma-ray detector and the second gamma-ray detector, and the energy deposited in the at least one scintillator material by the delayed gamma radiation, and/or finding and analyzing delayed detections comprising prompt components and delayed components in the digitized time series data of the first gamma-ray detector by means of pulse pile-up reconstruction techniques in order to quantify the time differences between said prompt components and delayed components, and the energy deposited in the at least one scintillator material by the delayed gamma radiation.

The exploitation of delayed coincidences between a first gamma-ray detector and a second gamma-ray detector of an ENCD instead of or in addition to analyze delayed detections in pulse sequences of a single gamma-ray detector of an ENCD allows analyzing even shorter time differences between the prompt components and the delayed components down to the few-nanosecond range thereby widening the deployable range of lifetimes of long-lived excited states.

Preferably, one of the at least one neutron-gamma converter is arranged between the first gamma-ray detector and the second gamma-ray detector, and the second gamma-ray detector comprises a layer of scintillating organic material, wherein the layer of scintillating organic material is adapted to also provide an anti-coincidence signal if energetic charged particles from cosmic radiation enter the first gamma-ray detector through the said layer of organic material, thus serving as an anti-cosmic radiation shield for the first gamma-ray detector.

Consequently, the latter embodiment has the advantage that the at least one scintillator material of the second gamma-ray detector serves two technical functions in one: it is capable to detect at least the delayed components emitted in the de-excitation of the at least one long-lived excited state in the de-excitation cascades upon neutron captures, and it is designed as anti-cosmic shield, capable of marking and rejecting signals resulting from cosmic rays interacting with the first and the second detector. A scintillating organic material, preferably based on polyvinyl toluene (PVT), polystyrene (PS), polymethylmethacrylate (PMMA), or polyurethane (PU), is characterized by a relatively short light decay time and may be provided in a layer having a thickness, wherein the thickness may be tuned to a low absorption probability of higher-energetic gamma-rays such as the prompt components emitted in the de-excitation cascades upon neutron captures, while providing a reasonably large absorption probability for gamma-rays with energies up to 90 keV such as emitted in the de-excitation cascade from the relevant long-lived excited states in $^{151}$Eu, $^{155}$Gd and $^{157}$Gd.

In an embodiment of the invention the at least one scintillator material comprises organic material, and the neutron-gamma converter comprises $^{151}$Eu or $^{155}$Gd and/or $^{157}$Gd, and the at least one neutron-gamma converter is arranged around and/or between each of the at least one gamma-ray detector.

Hence, existing portal detectors for homeland security applications, often comprising organic materials such as polyvinyl toluene, can be readily upgraded to detect both gamma rays and slow (thermal) neutrons.

In one embodiment of the invention, the analyzer is adapted to generate a distribution of time differences between prompt components and delayed components, to discriminate a first signal resulting from a time correlation between prompt components and delayed components from uncorrelated background in said distribution, and to determine a strength of said first signal, wherein the strength of said first signal provides a measure for a thermal neutron flux the apparatus is exposed to.

In a further embodiment of the invention, the analyzer is adapted to generate a distribution of energies deposited by the delayed components, to discriminate a second signal resulting from a distribution of energies deposited by the delayed components following neutron captures from uncorrelated background in said distribution, and to determine a strength of said second signal, wherein the strength of said second signal provides a measure for a thermal neutron flux the apparatus is exposed to.

Hence, there are generally two approaches to determine a measure for the thermal neutron flux the ENCD is exposed to, namely by analyzing the distribution of time differences between the prompt and the delayed components, and by analyzing the distribution of energies deposited by the delayed components.

Further, these two approaches may be combined in case the background due to random, uncorrelated pulse pile-ups becomes large compared to the correlated signal: The distribution of time differences may be reduced to time differences that correspond to delayed components having a corresponding energy deposition in the scintillator material in an expected energy range, the expected energy range being characterized by the at least one long-lived excited state involved in the de-excitation cascades upon neutron captures.

Preferably, the at least one scintillator material comprises at least one neutron-gamma converter intrinsically.

In an embodiment of the present invention, the neutron-gamma converter is arranged in form of a Fe-comprising casing covering the at least one scintillator material at least partially.

In one embodiment of the present invention, the at least one scintillator material and corresponding electronics is small enough to be arranged in a handheld device, and the at least one scintillator material and the at least one neutron-gamma converter are non-toxic.

In yet another embodiment of the present invention, the at least one scintillator material and corresponding electronics is small enough to be arranged in a backpack, and the at least one scintillator material and the at least one neutron-gamma converter are non-toxic.

Hence, the apparatus provided by the disclosure can be designed small enough to allow its use in mobile homeland security applications and/or in geophysical investigations of boreholes.

Further the disclosure provides a method to detect neutrons and gamma rays, utilizing at least one gamma-ray detector comprising at least one scintillator material with a light decay time, a photo detector with an amplifier, at least one neutron-gamma converter in gamma communication with the at least one scintillator material of the at least one gamma-ray detector, wherein the at least one neutron-gamma converter comprises at least one isotope having a thermal neutron capture cross-section larger than 1 barn and a daughter nucleus having a level scheme comprising at least one long-lived excited state, wherein the at least one long-lived excited state has a lifetime between 1 nanosecond and 500 nanoseconds, and is at least sometimes involved in de-excitation cascades following neutron captures, resulting in an electrical signal of the at least one gamma-ray detector comprising delayed gamma radiation of de-excitation cascades from the at least one long-lived excited state emitted by said at least one neutron-gamma converter following a prompt gamma radiation emitted by said at least one neutron-gamma converter, at least one digitizer comprising sampling Analog to Digital Converters, ADC, and an analyzer which is coupled operatively to the at least one digitizer. The method comprises the following steps:

neutrons interacting with the at least one isotope of the at least one neutron-gamma converter generating a daughter isotope upon neutron capture, wherein the daughter isotope de-excites both under a prompt emission of gamma radiation and at least partially via at least one long-lived excited state under a delayed emission of gamma radiation, the at least one gamma-ray detector recording an electrical signal from an interaction between gamma rays and the at least one scintillator material, wherein the electrical signal is in a known relationship with the energy deposited by the detected gamma rays in the scintillator material, each of the at least one digitizer sampling the electrical signal of the at least one gamma-ray detector with a predetermined frequency to generate digitized time series data of the detected gamma rays, and transmitting the digitized time series data to the analyzer, the analyzer finding and analyzing delayed detections comprising of prompt components and delayed components in the digitized time series data of the at least one digital spectrometer thereby quantifying event parameters, the event parameters comprising the time differences between prompt components and delayed components, and the energy deposited in the at least one scintillator material by the delayed gamma radiation, and the analyzer computing a measure for a thermal neutron flux using the event parameters.

Preferably, the analyzer finds and analyzes delayed detections in the digitized time series data of the at least one digitizer by means of pulse pile-up reconstruction techniques, utilizing a method to decompose the digitized time series data into their constituents thereby quantifying the event parameters.

Further preferably, the method utilizes a first gamma-ray detector and a second gamma-ray detector, whereby the analyzer determines the event parameters by comparing the digitized time series data of the first gamma-ray detector and the second gamma-ray detector in order to find delayed coincidence detections comprising prompt components and delayed components between the first gamma-ray detector and the second gamma-ray detector and to quantify the time differences between said prompt components and delayed components between the first gamma-ray detector and the second gamma-ray detector, and the energy deposited in the at least one scintillator material by the delayed gamma radiation, and/or finding and analyzing delayed detections in the digitized time series data of the first gamma-ray detector by means of pulse pile-up reconstruction techniques in order to quantify the time differences between said prompt components and delayed components, and the energy deposited in the at least one scintillator material by the delayed gamma radiation.

In one embodiment of the invention, the analyzer generates a distribution of time differences between prompt components and delayed components, discriminates a first signal resulting from a time correlation between prompt components and delayed components from uncorrelated background in said distribution, and determines a strength of said first signal, wherein the strength of said first signal provides a measure for a thermal neutron flux.

In a further embodiment of the invention, the analyzer generates a distribution of energies deposited by the delayed components, discriminates a second signal resulting from a distribution of energies deposited by the delayed components following neutron captures from uncorrelated background in said distribution, and determines a strength of said second signal, wherein the strength of said second signal provides a measure for a thermal neutron flux.

Preferably, the at least one isotope of the neutron-gamma converter is at least one of a group of isotopes, the group of isotopes comprising $^{151}$Eu, $^{155}$Gd, $^{157}$Gd, $^{133}$Cs, $^{70}$Ge, $^{79}$Br, $^{81}$Br, $^{127}$I, $^{56}$Fe, $^{110}$Cd, and $^{113}$Cd.

BRIEF DESCRIPTION OF THE DRAWING

Some embodiments of the invention are explained in the following with reference to the figures. Those show the following.

DETAILED DESCRIPTION OF THE PREFERRED EMBODIMENTS

Figure 1:
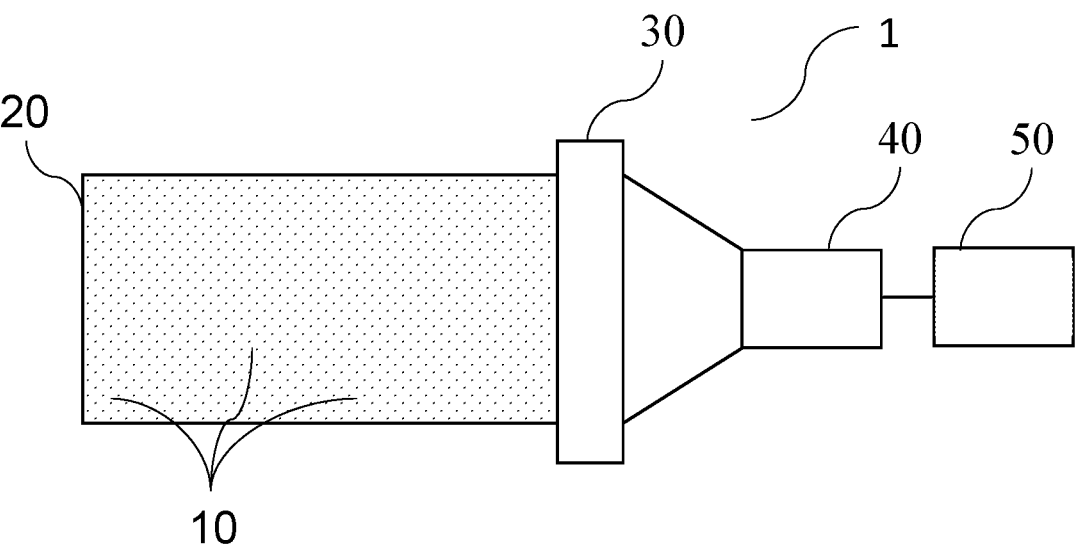
FIG. 1 shows a schematic setup of a first embodiment of the enhanced neutron capture detector (ENCD) provided by the present invention.

FIG. 1 shows a first embodiment of the enhanced neutron capture detector (ENCD) provided by the present invention.

Shown is a neutron capture gamma detector 1 comprising one gamma-ray detector comprising a scintillator material 20 with a light decay time and a photo detector 30 with an amplifier. The gamma-ray detector is adapted to record an electrical signal from an interaction between gamma rays and the scintillator material 20. The electrical signal is in a known relationship with the energy deposited by the detected gamma rays in the scintillator material 20.

Preferably, the photo detector 30 is a photomultiplier tube with intrinsic signal amplification. The photomultiplier may as well be an avalanche photodiode or a silicon photomultiplier (SiPM).

The embodiment of the ENCD of FIG. 1 further comprises a neutron-gamma converter 10 in gamma communication with the scintillator material 20 of the at least one gamma-ray detector. The neutron-gamma converter 10 is adapted to emit gamma radiation upon capturing neutrons. The neutron gamma converter 10 may be arranged external of the scintillator material 20, or may be—as shown in FIG. 1—an intrinsic component of the scintillator material 20, e.g. as dopant or constituent of the scintillator material 20.

More specifically, the neutron-gamma converter 10 may be either a constituent of the scintillator material 20—as $^{79}$Br and $^{80}$Br in LaBr$_3$ or CeBr$_3$, $^{133}$Cs in CsI, $^{127}$I in CsI, NaI, or SrI$_2$, $^{110}$Cd and $^{113}$Cd in CdWO$_4$, $^{70}$Ge in BGO—or a dopant added to the basic scintillator material, as $^{151}$Eu in SrI(Eu) or CaF$_2$(Eu), $^{151}$Eu or $^{155}$Gd and $^{157}$Gd in Eu- or Gd-doped organic or inorganic scintillators.

The scintillator material 20 may be an inorganic solid and/or an organic liquid and/or an organic solid substance. The scintillator material 20 can have a crystalline phase.

Needless to say, scintillator material 20 and the photo detector 30 may be wrapped in light-reflecting materials and arranged in a housing to protect them from external light and humidity (not shown).

The embodiment of the ENCD of FIG. 1 further comprises a digitizer 40 comprising sampling Analog to Digital Converters, ADC. The digitizer 40 is adapted to sample the electrical signal of the gamma-ray detector with a predetermined frequency to generate digitized time series data of the detected gamma rays.

In case the ENCD comprises a plurality of gamma-ray detectors, each gamma-ray detector, more precisely the photodetectors and amplifiers of each gamma-ray detector, may be coupled to individual digitizers.

The embodiment of the ENCD of FIG. 1 also comprises an analyzer 50 which is coupled operatively to the digitizer 40. The digitizer 40 is adapted to transmit the digitized time series data to the analyzer 50, and the analyzer 50 is adapted to analyze the digitized time series data in order to determine a measure of the thermal neutron flux the ENCD is exposed to.

Preferably, the analyzer 50 is adapted to analyze the digitized time series data and to determine a measure of the thermal neutron flux the ENCD is exposed to in real-time.

The neutron-gamma converter 10 of the embodiment shown in FIG. 1 comprises at least one isotope with a thermal neutron capture cross-section larger than 1 barn and a daughter nucleus having a level scheme comprising at least one long-lived excited state, wherein the at least one long-lived excited state has a lifetime between 1 nanosecond and 500 nanoseconds, and is at least sometimes involved in de-excitation cascades following neutron captures, resulting in an electrical signal of the at least one gamma-ray detector comprising delayed gamma radiation of de-excitation cascades from the at least one long-lived excited state emitted by said at least one neutron-gamma converter 10 following a prompt gamma radiation emitted by said at least one neutron-gamma converter 10.

Further, the analyzer 50 of the embodiment shown in FIG. 1 is adapted to find and analyze delayed detections comprising prompt components and delayed components in the digitized time series data of the at least one digitizer 40 in order to quantify event parameters, the event parameters comprising the time differences between said prompt components and delayed components, and the energy deposited in the at least one scintillator material 20 by the delayed gamma radiation. The event parameters may further comprise the energy deposited in the at least one scintillator material 20 by the prompt gamma radiation.

More specifically, the analyzer 50 is adapted to carry out pulse pile-up reconstruction techniques, wherein the pulse pile-up reconstruction techniques comprise a method to decompose the digitized time series data into their constituents. Each constituent may have a pulse shape comprising an onset, the onset being characterized by a sharp rise in a finite time, and an exponential decay, the exponential decay being essentially characterized by the light decay time of the scintillator material 10. Based on these constituents, the analyzer 50 may quantify the time differences between said prompt components and delayed components, i.e. the time difference between the onsets of the prompt components and the onsets of the delayed components. Further, the analyzer 50 may compute the energy deposited in the at least one scintillator material 20 by the delayed gamma radiation and/or prompt gamma radiation, namely by integrating the constituent corresponding to the delayed component and/or prompt component.

The analyzer 50 may carry out the pulse pile-up reconstruction techniques and subsequent computation of event parameters in real-time.

The neutron-gamma converter 10 of the embodiment of the NCD shown in FIG. 1 is comprised intrinsically in the scintillator material 20, providing a neutron absorbing scintillator material 20. In the following, five concrete examples of ENCD with neutron absorbing scintillator materials are disclosed. The described examples are provided for illustrative purposes and are not intended to limit the scope of the invention.

Firstly, an ENCD with a Eu-doped SrI scintillator which is an inorganic scintillator exhibiting excellent energy resolution. On the one hand, the light decay time of Eu-doped SrI is in the microsecond range, much larger than the light decay time of Tl-doped NaI. On the other hand, the dopant makes Eu-doped SrI a very efficient neutron absorber: Eu in its natural composition has a thermal neutron capture cross section of 4560 barn. A dopant concentration at the percent level is therefore sufficient for turning the scintillator material 20 into an efficient neutron absorber. According to Walther Kaiser, Z. Naturforsch. 25 a, 602-607 (1970), and the NuDat 2.8 database available online from the National Nuclear Data Center, Brookhaven National Laboratory, USA, de-excitation cascades of the daughter nucleus $^{152}$Eu following neutron captures on $^{151}$Eu often involves the 89.85 keV state having a lifetime of 384 ns. According to the elemental $\sigma_\gamma^Z$ and partial $\sigma_\gamma^Z (E_\gamma)$ cross sections given in "Database of prompt gamma rays from slow neutron capture for elemental analysis", IAEA (2007), the probability of emitting a 89.85 keV gamma ray, which is due to the de-excitation of this long-lived excited state to ground state, per neutron capture occurring in elemental Eu is 31.4%. In other words, almost every third neutron capture in $^{nat}$Eu is accompanied with the delayed emission of a 89.85 keV gamma ray from $^{152}$Eu, with a time delay according to the half-life of the 89.85 keV level, i.e., 384 ns. Due to the relatively large light decay time of Eu-doped SrI, the de-excitation signals from the 89.85 keV level pile up with the prompt gamma signal upon neutron capture. Therefore, the electrical signal of the photo detector 30 is to be sampled with a reasonably high frequency, and the analyzer 50 is to be capable of pulse pile-up reconstruction techniques and/or delayed coincidence detections in case of a multi-detector setup in order to compute the thermal neutron flux the ENCD is exposed to from these piled-up signals.

Secondly, an ENCD with a Eu-doped liquid or solid organic scintillator. Due to its large thermal neutron capture cross-section, a small admixture of $^{151}$Eu to the bulk of organic scintillators can be sufficient to make the scintillator material an efficient neutron absorber. As described above, the long-lived 89.85 keV state in $^{152}$Eu is often involved in the de-excitation cascades following neutron captures in $^{nat}$Eu. As a consequence, the sensitivity of the neutron detection can be increased with respect to a corresponding conventional NCD as know from e.g. EP 24 600 32 A1 by adding delayed coincidence detection, thus enabling part of the neutron events below the NCD threshold to be identified as neutron events.

Thirdly, an ENCD with $LaBr_3$ and/or $CeBr_3$ scintillators. $LaBr_3$(Ce) and $CeBr_3$ scintillators are distinguished by excellent energy and time resolution, as well as short light decay times allowing spectroscopic measurements at high count rates. The bromine constituent with an elemental neutron-capture cross-section of about 6.3 barn makes these materials excellent neutron absorbers enabling neutron capture gamma processes in these scintillator materials. According to the NuDat 2.8 database available online from the National Nuclear Data Center, Brookhaven National Laboratory, USA, the daughter nuclides $^{80}$Br and $^{82}$Br produced in neutron captures on $^{79}$Br and $^{81}$Br, both comprised in natural elemental bromine, exhibit de-excitation cascades involving long-lived states, namely the 37.05 keV and 75.06 keV states, respectively. Due to the short light decay times of the $LaBr_3$ and $CeBr_3$ scintillators, the respective 7.43 ns and 7.2 ns lifetimes of these long-lived states are sufficiently large for efficient DCD using pulse pile-up reconstruction techniques and/or delayed coincidence detection, supposed the ADC sampling rates are high enough.

Fourthly, an ENCD with conventional (e.g. Tl-doped) NaI and/or (e.g. Tl- or Na-doped) CsI scintillators using pulse pile-up reconstruction techniques. As a consequence of the present disclosure, the efficiency of neutron detection can be improved in comparison to the method mentioned by Yakushev et al in Nucl.Inst.Meth. A 848 (2017) 162. Pulse pile-up reconstruction techniques allow exploiting the shorter-lived 133.61 keV state in $^{128}$I having a lifetime of only 12.3 ns instead of only the exploiting the 137.85 keV (845 ns) state as proposed by Yakushev. According to the elemental $$\sigma_\gamma^Z$$

and partial $$\sigma_\gamma^Z(E_\gamma)$$

cross sections given in "Database of prompt gamma rays from slow neutron capture for elemental analysis", IAEA (2007), the share of 133.61 keV delayed gamma emissions from the 133.61 keV (12.3 ns) state is about seven times larger than the share of the dominating 52.4 keV transition from the longer-lived 137.35 keV (845 ns) state. For CsI scintillators, the cesium constituent dominates the neutron captures due to its larger elemental thermal neutron capture cross-section. The long-lived 176.4 keV state of the daughter nucleus $^{134}$Cs produced in neutron captures on $^{133}$Cs also enables neutron detection by DCD in CsI scintillators.

Fifthly, an ENCD with Gd-doped liquid or solid organic scintillator. Due to the very large thermal neutron capture cross-sections, a small admixture of $^{nat}$Gd comprising the isotopes $^{155}$Gd and/or $^{157}$Gd to the bulk of organic scintillators is sufficient to make the scintillator material an efficient neutron absorber. Two prominent excited states in $^{156}$Gd and $^{158}$Gd with reasonable shares of the corresponding de-excitation gamma rays in the total gamma yield of neutron captures in $^{nat}$Gd, are distinguished by short but still acceptable lifetimes between 2 ns and 3 ns. Due to the usually short light decay times of organic scintillators, fast pulse sampling combined with pulse pile-up reconstruction techniques may enable resolving at least part of the prompt and delayed components following neutron captures. As a result, the efficiency of NCD designed for gamma-ray and neutron detection in portal detectors using organic scintillator materials based e.g. on polyvinyl toluene (PVT), poly-styrene (PS), polymethylmethacrylate (PMMA), or polyure-thane (PU), may be improved by the present disclosure.

Figure 2:
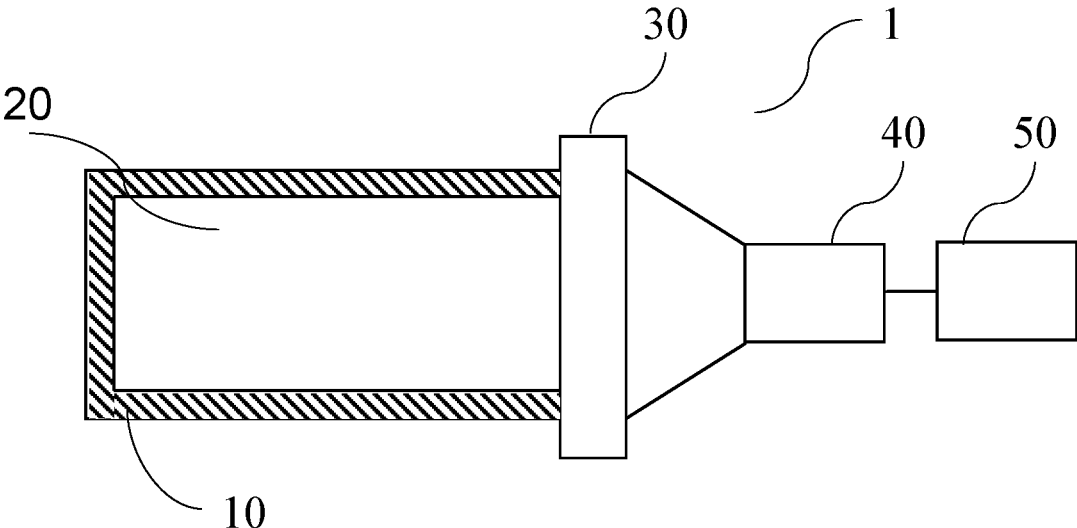
FIG. 2 shows a schematic setup of a second embodiment of the enhanced neutron capture detector (ENCD) provided by the present invention.

FIG. 2 shows a second embodiment of the enhanced neutron capture detector (ENCD) provided by the present disclosure.

Shown is an enhanced neutron capture gamma detector 1 comprising one gamma-ray detector comprising a scintillator material 20 with a light decay time and a photo detector 30 with an amplifier. The gamma-ray detector is adapted to record an electrical signal from an interaction between gamma rays and the scintillator material 20. The electrical signal is in a known relationship with the energy deposited by the detected gamma rays in the scintillator material 20.

The second embodiment of the ENCD according to the invention differs from the first embodiment shown in FIG. 1 in that the neutron converter 10 is not comprised intrinsically in the scintillator material 20, but arranged around the scintillator material 20, either inside or outside the detector housing (not shown).

The external neutron-gamma converter 10 may be arranged arbitrarily as long as it remains in gamma communication with the scintillator material 20, i.e. the emitted gamma rays upon neutron captures may deposit their energies in the scintillator material 20. The neutron-gamma converter 10 may e.g. be arranged in the form of a cap, a mantle, a coating or jacket, or comprised in a paint or tape or foil enwrapping the detector, it may even be laid out as reflector material. Further, the neutron gamma converter 10 may be arranged in between detectors, or be a constituent of the detector housing or cabinet (not shown), such as $^{56}$Fe in steel housings or cabinets.

With respect to FIG. 2 two further concrete examples of embodiments of an ENCD are disclosed. The described examples are provided for illustrative purposes and are not intended to limit the scope of the invention.

Firstly, an ENCD with an inorganic scintillator that may be equipped with a Eu-comprising coating or jacket. In doing so, (slow) neutrons may be absorbed in the neutron-gamma converter 10 generating a daughter nucleus which subsequently de-excites under emission of prompt and (at least sometimes) delayed gamma rays, wherein the latter may dispose their energies in the inorganic scintillator 20 thus being detected by the photo detector 30. In the de-excitation of the daughter nucleus $^{152}$Eu, the long-lived excited state at 89.85 keV is often involved. Pulse pile-up reconstruction techniques are applied for resolving the prompt and delayed signals. Hence, the neutron detection efficiency of the ENCD may be considerably improved compared to prior NCD.

Secondly, portal detectors may be equipped with Eu- or Gd-comprising neutron-gamma converters 10. Modular portal detectors may comprise one or more gamma ray detector elements which comprise e.g. polyvinyl toluene (PVT), polystyrene (PS), polymethylmethacrylate (PMMA), or polyurethane (PU) based scintillator material 20. Eu- or Gd-comprising neutron-gamma converters 10 can be arranged around a detector element or between detector elements, thereby significantly increasing the neutron sensitivity of modular portal detectors by means of delayed capture-gamma detection (DCD) and/or delayed coincidence detection techniques according to the present disclosure.

Figures 3A, 3B, 3C:
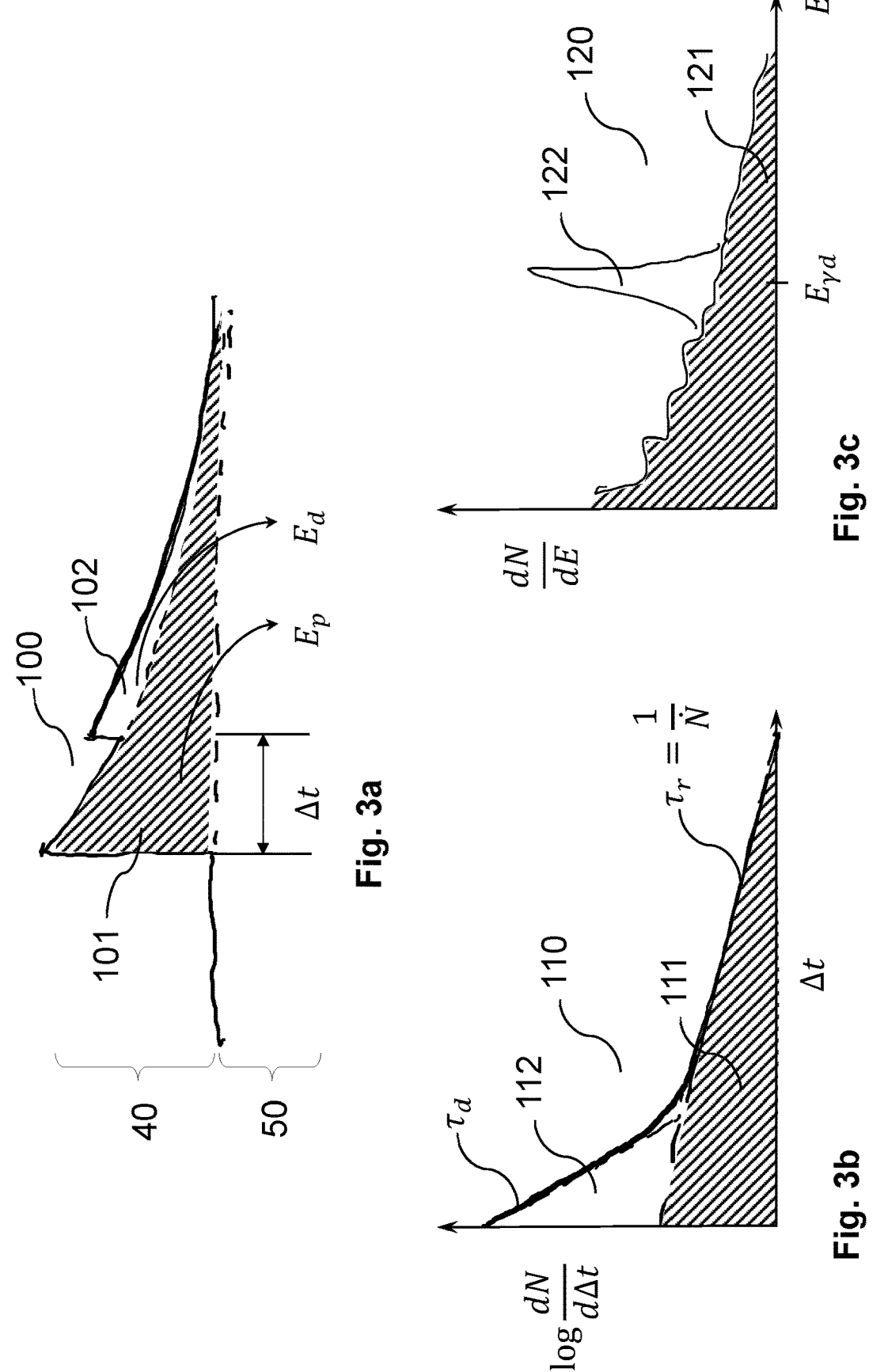
FIGS. 3a-3c show sketches illustrating exemplary data analysis procedures performed by the analyzer to provide a measure for the thermal neutron flux an ENCD is exposed to, based on DCD with a single detector or detector element.

FIGS. 3a-3c show sketches illustrating exemplary data analysis procedures performed by the analyzer to provide a measure for the thermal neutron flux an ENCD is exposed to, based on DCD with a single detector or detector element.

Upon capturing a (slow) neutron in the neutron-gamma converter 10, a daughter nucleus is generates which subsequently de-excites via a gamma-ray cascade. In case the gamma-ray cascade involves a long-lived excited state with a lifetime $\tau_d$, and further in case that both the prompt part and the delayed part of the gamma-ray cascade deposit energy in the scintillator material 20, the electrical signal of the photodetector 30 digitized by the digitizer 40 consists of a prompt component 101 and a delayed component 102. Both components exhibit an onset with a fast rise and an essentially exponential decay given by the light decay time of the scintillator material. If the lifetime $\tau_d$ of the long-lived excited state is smaller than the light decay time of the scintillator material, the signal of the prompt components 101 and the delayed components 102 mostly pile up, and the prompt and the delayed components are detected as just one signal 100.

FIG. 3a illustrates an output of the pile-up reconstruction technique.

The pile-up reconstruction algorithm implemented in the analyzer 50 decomposes the piled-up signal 100 provided by the digitizer 30 into the prompt component 101 and the delayed component 102.

Further, the analyzer 50 determines the event parameters: energy depositions of the prompt component, $E_p$, and of the delayed component, $E_d$, as well as the time difference/interval $\Delta t$ between the onsets of both components.

The energy deposition of the delayed component, $E_d$, alone or in conjunction with the time difference between the onsets of both components provide direct signatures of (slow) neutron capturing events in the neutron-gamma converter 10 and therefore are crucial inputs for computing a measure of the (slow) neutron flux the ENCD is exposed to.

FIG. 3b illustrates a distribution of time differences as part of the data analysis procedure performed by the analyzer.

The distribution of time differences 110, more specifically, the distribution of counts dN per slice d$\Delta t$ of the time differences $\Delta t$ between the piled-up prompt components 101 and delayed components 102 basically comprises two components 111; 112:

A first component 111 that is characterized by a decay constant $$\tau_r = 1/\dot{N} \text{ with } \dot{N}$$

being an overall count rate of the gamma-ray detector. The first component 111 results from random pile-ups of uncorrelated signals;

A second component 112 that is characterized by the lifetime $\tau_d$ of the long-lived excited state involved in the gamma-ray de-excitation cascade following a neutron capture. The second component 112 results from the physically determined time correlation between the prompt component 101 and the delayed component 102 of a single gamma-ray de-excitation cascade following a single neutron capture.

The strength of the second component 112 in the distribution of time differences 110 scales with the number of neutrons captured and therefore provides a measure of the thermal neutron flux the ENCD is exposed to.

FIG. 3c sketches a distribution of energies $E_d$ deposited by the delayed component of a piled-up pulse pair in the scintillator material as part of the data analysis procedure performed by the analyzer.

The distribution of energies $E_d$ 120, more specifically, the distribution of counts dN per slice d$E_d$ of the energies $E_d$ deposited in the scintillator material 20 by the delayed components, basically also comprises two components 121; 122:

A first component 121 resulting from random pile-ups of uncorrelated signals;

A second component 122 that is due to the delayed part of a gamma-ray cascade following neutron capture, and that reflects the prominent gamma line(s) (and/or, in case of an intrinsic neutron-gamma converter being part of the scintillator material, also converted transitions) emitted in de-excitation of the long-lived excited state.

The de-excitation cascade from the long-lived excited state may involve multiple gamma lines. However, mostly one of these gamma lines with energy $E_{\gamma d}$ dominates, i.e. it is a strong transition in the de-excitation cascade of the long-lived excited state. The second component 122 then comprises a peak in the distribution of energies deposited 120, located at the energy $E_{\gamma d}$. The area of this peak scales with the number of neutrons captured and therefore also provides a measure of the thermal neutron flux the ENCD is exposed to. If more transitions of comparable strength are involved, the distribution 120 comprises multiple peaks 122, and the neutron flux then scales with the sum area of these peaks.

The two approaches illustrated by FIGS. 3b and 3c may be combined in order to measure the thermal neutron flux the ENCD is exposed to accurately even in conditions with larger random background components 121. Namely, the analyzer 50 may generate a distribution of time differences $\Delta t$ only from events distinguished by energy depositions $E_d$ of the delayed component 102 in small ranges enclosing the energies of the strongest transition in the de-excitation cascade of the long-lived excited state, $E_{\gamma d}$.

Figure 4:
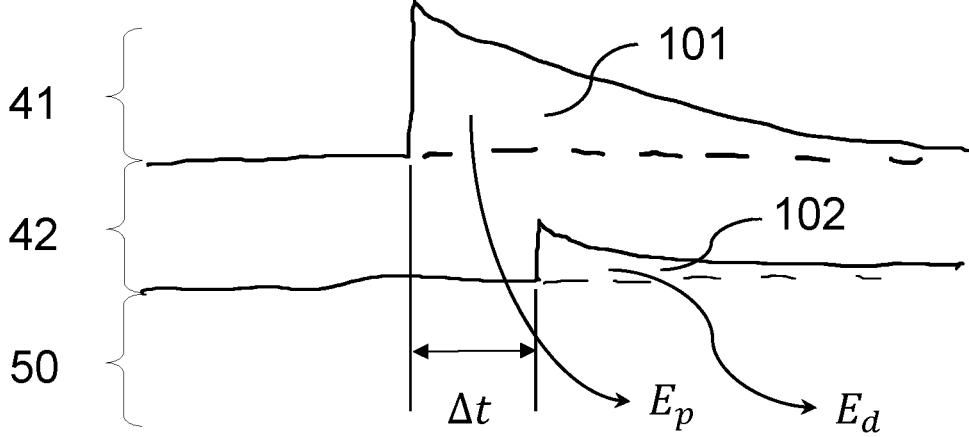
FIG. 4 shows a sketch illustrating exemplary data analysis procedures performed by the analyzer to provide a measure for the thermal neutron flux an ENCD is exposed to, based on DCD using delayed coincidence detections between distinct detectors or detector elements.

FIG. 4 shows a sketch illustrating exemplary data analysis procedures performed by the analyzer to provide a measure for the thermal neutron flux an ENCD is exposed to, based on DCD using delayed coincidence detections between distinct detectors or detector elements.

In an embodiment of the ENCD a first gamma-ray detector is coupled to a first digitizer 41 and a second gamma-ray detector is coupled to a second digitizer 42. FIG. 4 illustrates a case in which the prompt component 101 and the delayed component 102 of a gamma-ray de-excitation cascade following a neutron capture in the neutron-gamma converter 10 involving a long-lived excited state with a decay time Td deposit their energies in different gamma-ray detectors, e.g. the prompt component 101 deposits energy only in the first gamma-ray detector and the delayed component 102 deposits its energy only in the second gamma-ray detector. Consequently, the first digitizer 41 provides digitized time series data comprising a pulse shape corresponding to the energy deposited by the prompt component 101, $E_p$. Similarly, the second digitizer 42 provides digitized time series data comprising a pulse shape corresponding to the energy deposited by the delayed component 102, $E_d$. Further, the onsets of the pulse shapes provided by digitizers 41 and 42 differ by the time difference Δt.

With the prompt pulse 101 and the delayed pulse 102 being recorded in distinct channels, i.e. in the digitizers 41 and 42, respectively, the event parameters $E_p$, $E_d$, and Δt can be determined using common methods of energy spectroscopy and coincidence timing.

The analyzer 50 may determine a measure of the neutron flux the ENCD is exposed to following the procedures based on the distribution of time differences 110 and/or the distribution of energies deposited 120 as described above with reference to FIGS. 3b and 3c.

A major advantage of an embodiment with two distinct gamma-ray detectors and an analyzer being adapted to exploit delayed coincidence detections is that the decay time Td of the long-lived excited state in gamma-ray de-excitation cascades following neutron captures may be even much shorter than in case of the embodiments described with reference to FIGS. 1 and 2 relying on pulse pile-up reconstruction techniques. In practice, time differences Δt between pulse shapes/signals 101; 102 in distinct detectors can be measured with higher precision than time differences between piled-up pulses in a single detector. Pulse pile-up reconstruction is limited by the sampling frequency of available digitizers and the finite pulse rise times necessary for loss-free sampling, whereas time differences Δt between signals of distinct detectors can often be measured with sub-nanosecond precision. This advantage further widens the range of nuclides applicable as neutron-gamma converters 10.

In addition to discriminating the prompt component 101 and the delayed component 102 of the gamma-ray de-excitation cascades following neutron captures by means of delayed coincidence detections, the pulse pile-up reconstructions techniques described above with reference to FIGS. 3a-3c may be applied to any of the first and second gamma-ray detectors as well in order to increase the overall neutron sensitivity of an corresponding embodiment of the ENCD.

Figure 5:
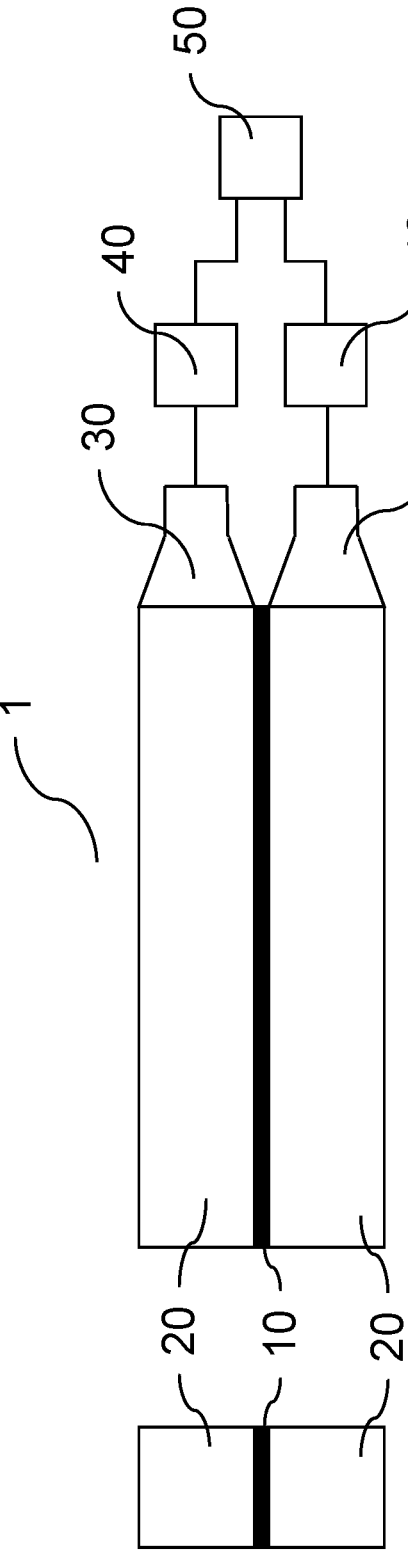
FIG. 5 shows a schematic setup of a third embodiment of the enhanced neutron capture detector (ENCD) provided by the present invention.

FIG. 5 shows schematic setup of a third embodiment of the enhanced neutron capture detector (ENCD) provided by the present invention.

Shown is an embodiment of the ENCD with two gamma-ray detectors comprising the same scintillator material 20 and a neutron-gamma converter 10 arranged in between the two gamma-ray detectors. Each gamma-ray detector comprises a photo detector 30 which may be operatively coupled to an individual digitizer 40. The digitizers 40 may sample the electrical signal of the photo detectors 30 to generate digitized time series data of the detected gamma rays and transmit the digitized time series data to an analyzer 50.

The scintillator material 20 may be e.g. Tl-doped NaI or a solid organic (plastic) scintillator, and the neutron-gamma converter 10 may be e.g. a thin layer comprising Eu or Gd, e.g. in form of $Eu_2O_3$ or $Gd_2O_3$.

The analyzer 50 is adapted to apply pulse pile-up reconstruction techniques and/or delayed coincidence detection techniques to the digitized time series data received from each digitizer 40 and/or from both digitizers simultaneously according to the procedures described with reference to the FIGS. 3a-3c and/or FIG. 4. As a result, the analyzer 50 may provide a measure of the thermal neutron flux the ENCD is exposed to.

The embodiment of the ENCD shown in FIG. 5 may be further generalized to n gamma-ray detectors and multiple neutron-gamma converters 10 with each neutron-gamma converter 10 being arranged between two adjacent gamma-ray detectors.

The embodiment of the ENCD shown in FIG. 5 may be applied e.g. as portal detectors in homeland security applications.

Figure 6:
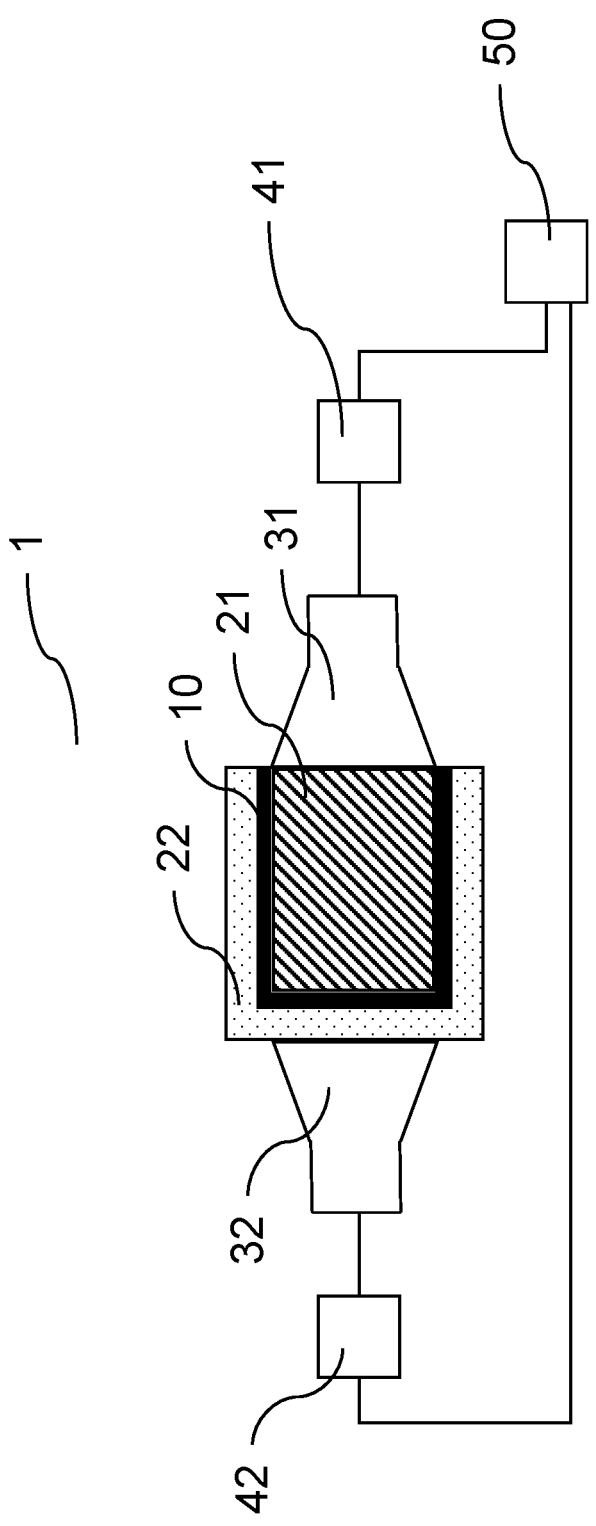
FIG. 6 shows a schematic setup of a fourth embodiment of the enhanced neutron capture detector (ENCD) provided by the present invention.

FIG. 6 shows a schematic setup of a fourth embodiment of the enhanced neutron capture detector (ENCD) provided by the present invention.

The embodiment of the ENCD shown in FIG. 6 comprises a first gamma-ray detector with a first scintillator material 21 and a second gamma-ray detector with a second scintillator material 22.

The first gamma-ray detector may be dedicated to gamma-ray spectroscopy and may comprise e.g. a Tl-doped NaI crystal as scintillator material 21 and a photo detector 31, preferably a photomultiplier.

The second gamma-ray detector may be designed as anti-cosmic shield, i.e. it may be capable of marking and rejecting signals resulting from cosmic rays interacting with the first and the second detector. The second gamma-ray detector may comprise a few-mm thin layer of scintillating organic material 22 and may be provided with a separate photodetector 32, based e.g. on silicon photomultipliers.

The neutron-gamma converter 10, e.g. a thin film or paint comprising Eu, e.g. in form of $Eu_2O_3$, is arranged between the first gamma-ray detector and the anti-cosmic shield, i.e. the second gamma-ray detector.

The analyzer 50 is adapted to analyze the digitized time series data provided by the first digitizer 41 using pulse pile-up reconstruction techniques as described above with reference to FIGS. 3a-3c, and/or analyze the digitized time series data provided by the first and second digitizers 41; 42 based on delayed coincidence detections as described above with reference to FIG. 4.

The thin layer or mantle of scintillating organic material 22 has a low absorption capability for higher-energetic gamma rays. It may, however, absorb low-energy radiation as usually emitted in de-excitation cascades of the long-lived excitation states in the de-excitation gamma-ray cascades following neutron capture. The energies of gamma-rays in the de-excitation cascades of long-lived excited states in the daughter nuclei of the nuclide [151]Eu, for instance, is about 90 keV, which provides a reasonably large absorption probability in the thin layer/mantle of scintillating organic material 22.

Figure 7:
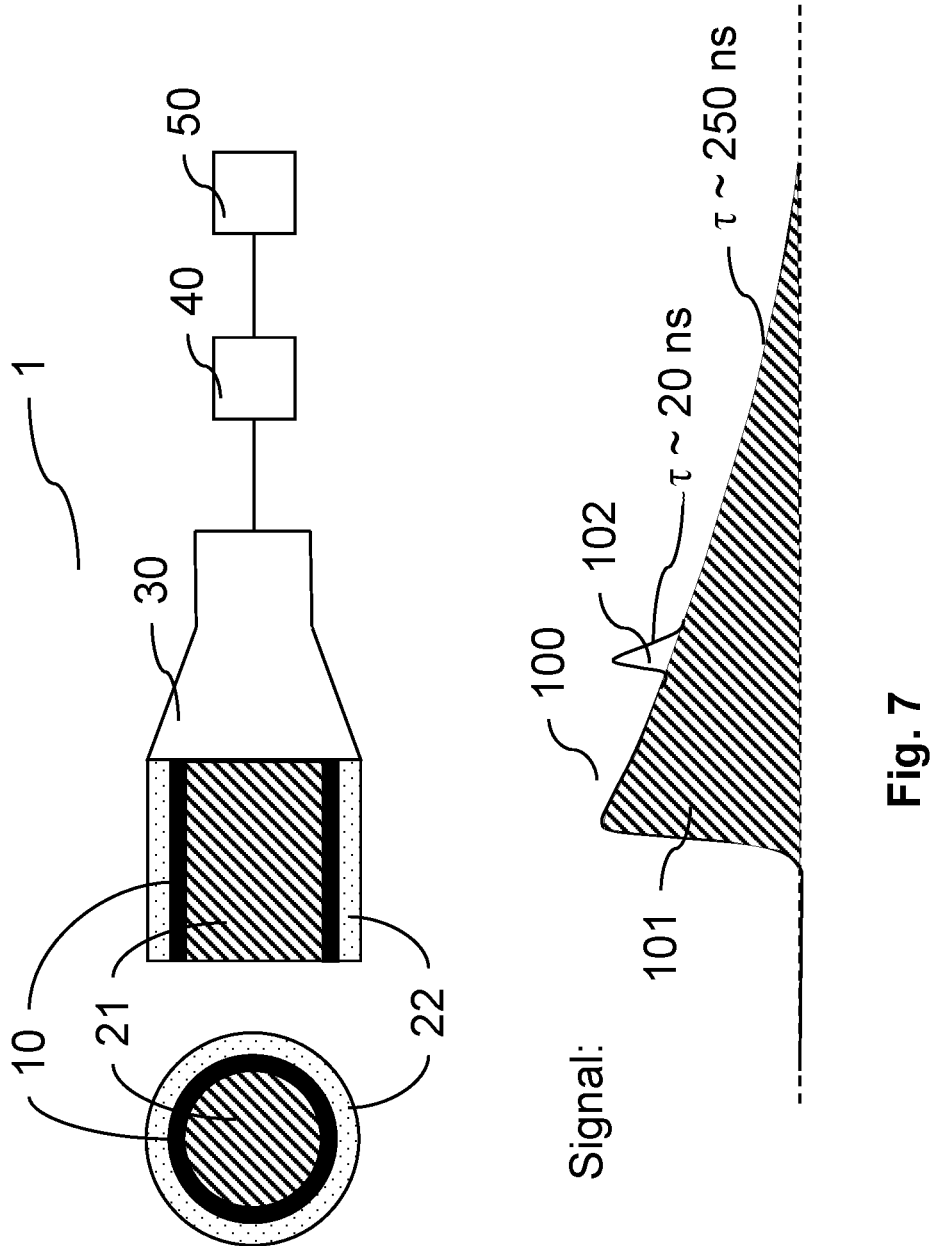
FIG. 7 shows a schematic setup of a fifth embodiment of the enhanced neutron capture detector (ENCD) provided by the present invention.

FIG. 7 shows a schematic setup of a fifth embodiment of the enhanced neutron capture detector (ENCD) provided by the present invention.

The embodiment of the ENCD shown in FIG. 7 comprises one gamma-ray detector with a first scintillator material 21 and a second scintillator material 22.

The first scintillator material 21 may e.g. be comprised of a Tl-doped NaI crystal.

The second scintillator material 22 may be designed as anti-cosmic shield, i.e. it may be capable of marking and rejecting signals resulting from cosmic rays interacting with the first and the second detector. The second scintillator material may be provided as a few-mm thin layer of scintillating organic material 22.

In contrast to the embodiment of the ENCD shown in FIG. 6, the first scintillator material 21 and the second scintillator material 22 share one photo detector 30 and a corresponding digitizer 40.

The neutron-gamma converter 10, e.g. a thin film or paint comprising Eu, e.g. in form of $Eu_2O_3$, is arranged between the first scintillator material 21 and the anti-cosmic mantle, i.e. the second scintillator material 22.

The analyzer 50 is adapted to analyze the digitized time series data provided by the digitizer 40 using pulse pile-up reconstruction techniques as described above with reference to FIGS. 3a-3c.

Further, the first scintillator material 21 may be selected to have a light decay time that is significantly longer than the usually short light decay time of an organic scintillator 22. Hence, in case the prompt component 101 of the de-excitation gamma-ray cascade deposit energy in the first scintillator material 21 and the delayed component 102 of the de-excitation gamma-ray cascade deposit energy in the second scintillator material 22, the analyzer 50 may additionally exploit the difference in the light decay times between the first scintillator material 21 and the second scintillator material 22, i.e. the different exponential decays of the respective pulse shapes 101; 102, to identify and to reconstruct the piled-up pulses and to determine the event parameters even more efficiently.

REFERENCE NUMERALS

1 Enhanced neutron capture detector
10 Neutron-gamma converter (intrinsic or external)
20 At least one scintillator material
21 First scintillator material
22 Second scintillator material
30; 31; 32 Photodetector with an amplifier
40 At least one digitizer
41 First digitizer
42 Second digitizer
50 Analyzer
100 Piled-up pulse signal provided by the at least one digitizer
101 Prompt component resulting from the de-excitation gamma-ray cascade following a neutron capture
102 Delayed component resulting from the de-excitation gamma-ray cascade of a long-lived excited state that is at least sometimes involved in the de-excitation gamma-ray cascade following a neutron capture
110 Distribution of time differences between the prompt components and the delayed components
111 First component in the distribution of time differences
112 Second component in the distribution of time differences
120 Distribution of energies deposited in the at least one scintillator material by the delayed component
121 First component in the distribution of energies deposited 122 Second component in the distribution of energies deposited

What is claimed is:

1. An apparatus to detect neutrons and gamma rays, comprising:
   at least one gamma-ray detector comprising at least one scintillator material with a light decay time coupled to a photo detector and an amplifier, wherein the at least one gamma-ray detector is adapted to record an electrical signal from an interaction between gamma rays and the at least one scintillator material;
   at least one neutron-gamma converter in gamma communication with the at least one scintillator material, wherein the at least one neutron-gamma converter is adapted to emit gamma radiation upon capturing neutrons, wherein the at least one neutron-gamma converter comprises at least one isotope having a thermal neutron capture cross-section larger than 1 barn and forming a daughter nucleus upon neutron capture, wherein the daughter nucleus has a level scheme including at least one long-lived excited state with a lifetime between 1 nanosecond and 500 nanoseconds that is at least sometimes populated in de-excitation cascades, such that neutron capture events produce a prompt gamma emission followed by a delayed gamma emission from the long-lived excited state;
   at least one digitizer, wherein each of the at least one digitizer is adapted to sample the electrical signal of the at least one gamma-ray detector with a predetermined frequency to generate digitized time series data; and
   an analyzer which is coupled operatively to the at least one digitizer, wherein the at least one digitizer is adapted to transmit the digitized time series data to the analyzer, and wherein the analyzer is adapted to:
      identify, in the digitized time series data, events comprising a prompt component and at least one delayed component;
      for each of the events, determine event parameters comprising a time difference between the prompt component and the at least one delayed component and an amount of energy deposited in the scintillator material by the at least one delayed component;
      for each of the events, discriminate between a neutron capture event and a gamma-ray-only event based on a combined analysis that is a function of the time difference between the prompt component and the at least one delayed component and an amount of the energy deposited by the at least one delayed component, wherein a neutron capture event is characterized at least in part by said energy being within a predefined energy range; and
      compute a measure of neutron flux using the discriminated neutron capture events.

2. The apparatus of claim 1, wherein the photo detector of the at least one gamma-ray detector is a photomultiplier tube, a silicon photomultiplier (SiPM), or an avalanche photodiode.

3. The apparatus of claim 1, wherein the lifetime of the at least one long-lived excited state is smaller than the light decay time of the at least one scintillator material.

4. The apparatus of claim 1, wherein the at least one isotope of the at least one neutron-gamma converter is at least one of $^{151}Eu$, $^{155}Gd$, $^{157}Gd$, $^{133}CS$, $^{70}Ge$, $^{79}Br$, $^{81}Br$, $^{127}I$, $^{56}Fe$, $^{110}Cd$, and $^{113}Cd$.

5. The apparatus of claim 1, wherein the at least one scintillator material comprises the at least one neutron-gamma converter intrinsically, and is preferably at least one of SrI, SrI(Eu), LaBr$_3$, LaBr$_3$, (Ce), CeBr$_3$, NaI, NaI(TI), CsI, CsI(Na), CsI(TI), organic materials, organic materials with Eu or Gd doping, bismuth germanate (BGO), CdWO$_4$ (CWO), Gd$_2$SiO$_5$ (GSO), or GSO(Ce).

6. The apparatus of claim 1, wherein the analyzer is adapted to execute one or more pulse pile-up reconstruction techniques, wherein the pulse pile-up reconstruction techniques comprise decomposing the digitized time series data into their constituents in order to quantify the event parameters.

7. The apparatus of claim 1, wherein at least one neutron-gamma converter is arranged in form of a Eu-comprising coating at least partially covering the at least one scintillator material.

8. The apparatus of claim 1, wherein the apparatus comprises a first gamma-ray detector and a second gamma-ray detector, wherein the first gamma-ray detector is adapted to detect both the prompt gamma radiation and the delayed gamma radiation emitted by the at least one neutron-gamma converter;

the second gamma-ray detector is adapted to predominantly detect only the delayed gamma radiation emitted by the at least one neutron-gamma converter; and the analyzer is adapted to determine the event parameters by executing one of the following:

comparing the digitized time series data of the first gamma-ray detector and the second gamma-ray detector in order to find delayed coincidence detections comprising prompt components and delayed components between the first gamma-ray detector and the second gamma-ray detector and to quantify the time differences between said prompt components and delayed components between the first gamma-ray detector and the second gamma-ray detector, and the energy deposited in the at least one scintillator material by the delayed gamma radiation; or finding and analyzing delayed detections comprising prompt components and delayed components in the digitized time series data of the first gamma-ray detector by means of pulse pile-up reconstruction techniques in order to quantify the time differences between said prompt components and delayed components, and the energy deposited in the at least one scintillator material by the delayed gamma radiation.

9. The apparatus of claim 8, wherein one of the at least one neutron-gamma converter is arranged between the first gamma-ray detector and the second gamma-ray detector, and the second gamma-ray detector comprises a layer of scintillating organic material, wherein the layer of scintillating organic material is adapted to provide an anti-coincidence signal if energetic charged particles from cosmic radiation enter the first gamma-ray detector through the said layer of organic material, thus serving as an anti-cosmic radiation shield for the first gamma-ray detector.

10. The apparatus of claim 1, wherein the at least one scintillator material and corresponding electronics are configured to be arranged in a handheld device, and the at least one scintillator material and the at least one neutron-gamma converter are non-toxic.

11. The apparatus of claim 1, wherein the at least one scintillator material and corresponding electronics are configured to be arranged in a backpack, and the at least one scintillator material and the at least one neutron-gamma converter are non-toxic.

12. A method to detect neutrons and gamma rays, utilizing at least one gamma-ray detector comprising at least one scintillator material with a light decay time coupled to a photo detector and an amplifier;

at least one neutron-gamma converter in gamma communication with the at least one scintillator material, wherein the at least one neutron-gamma converter is adapted to emit gamma radiation upon capturing neutrons, wherein the at least one neutron-gamma converter comprises at least one isotope having a thermal neutron capture cross-section larger than 1 barn and a daughter nucleus having a level scheme comprising at least one long-lived excited state, wherein the at least one long-lived excited state has a lifetime between 1 nanosecond and 500 nanoseconds, that is at least sometimes populated in de-excitation cascades, such that neutron capture events produce a prompt gamma emission followed by a delayed gamma emission from the long-lived excited state;

at least one digitizer, wherein each of the at least one digitizer is adapted to sample the electrical signal of the at least one gamma-ray detector with a predetermined frequency to generate digitized time series data; and an analyzer which is coupled operatively to the at least one digitizer, wherein the at least one digitizer is adapted to transmit the digitized time series data to the analyzer, wherein the analyzer is further configured to:

identify, in the digitized time series data, events comprising a prompt component and at least one delayed component;

for each of the events, determine event parameters comprising a time difference between the prompt component and the at least one delayed component and an amount of energy deposited in the scintillator material by the at least one delayed component;

for each of the events, discriminate between a neutron capture event and a gamma-ray-only event based on a combined analysis that is a function of the time difference between the prompt component and the at least one delayed component and an amount of the energy deposited by the at least one delayed component, wherein a neutron capture event is characterized at least in part by said energy being within a predefined energy range and wherein values defining said predefined energy range are dependent on a type of said scintillator material; and compute a measure of neutron flux using the discriminated neutron capture events.

13. The method of claim 12, wherein the analyzer is further configured to execute one or more pulse pile-up reconstruction techniques, wherein the pulse pile-up reconstruction techniques comprise decomposing the digitized time series data into their constituents to quantify the event parameters.

14. The method of claim 12, wherein the method utilizes a first gamma-ray detector and a second gamma-ray detector, whereby the analyzer determines the event parameters by one of:

comparing the digitized time series data of the first gamma-ray detector and the second gamma-ray detector in order to find delayed coincidence detections comprising prompt components and delayed components between the first gamma-ray detector and the second gamma-ray detector and to quantify the time differences between said prompt components and delayed components between the first gamma-ray detector and the second gamma-ray detector, and the energy deposited in the at least one scintillator material by the delayed gamma radiation; and finding and analyzing delayed detections in the digitized time series data of the first gamma-ray detector by means of pulse pile-up reconstruction techniques in order to quantify the time differences between said prompt components and delayed components, and the energy deposited in the at least one scintillator material by the delayed gamma radiation.

15. The method of claim 12, wherein the analyzer:

generates a distribution of time differences between prompt components and delayed components;

discriminates a first signal resulting from a time correlation between prompt components and delayed components from uncorrelated background in said distribution; and determines a strength of said first signal, wherein the strength of said first signal provides a measure for a thermal neutron flux.

16. The method of claim 12, wherein the analyzer:

generates a distribution of energies disposed by the delayed components;

discriminates a second signal resulting from a distribution of energies disposed by the delayed components following neutron captures from uncorrelated background in said distribution; and determines a strength of said second signal, wherein the strength of said second signal provides a measure for a thermal neutron flux.

17. The method of claim 12, wherein the at least one isotope of the at least one neutron-gamma converter is at least one of $^{151}$Eu, $^{155}$Gd, $^{157}$Gd, $^{133}$Cs, $^{70}$Ge, $^{79}$Br, $^{81}$Br, $^{127}$I, $^{56}$Fe, $^{110}$Cd, and $^{113}$Cd.

* * * * *